Sept. 11, 1951  R. F. G. HAMILTON  2,567,476
ELECTRIC CURRENT DISTRIBUTING SYSTEM
Filed March 9, 1949  2 Sheets-Sheet 1

Inventor
R. F. G. Hamilton

Patented Sept. 11, 1951

2,567,476

UNITED STATES PATENT OFFICE 2,567,476

ELECTRIC CURRENT DISTRIBUTING SYSTEM

Ralph Frederic Gilbert Hamilton, London, England, assignor to Rotax Limited, London, England Application March 9, 1949, Serial No. 80,486
In Great Britain March 13, 1948

2 Claims. (Cl. 322—28)

This invention relates to electric current distributing systems of the kind wherein direct current is supplied at different voltages to two different circuits from a common variable speed alternating current generator, the object of the invention being to provide improved means for regulating the voltage applied to the circuit of lower voltage.

The invention comprises the combination of a step-down transformer for interconnecting the two circuits, and a booster transformer situated between the step-down transformer and the low voltage circuit, the booster transformer being energised from the generator through a saturable choke which is controlled by a voltage regulator associated with the low voltage circuit.

Figure 1:
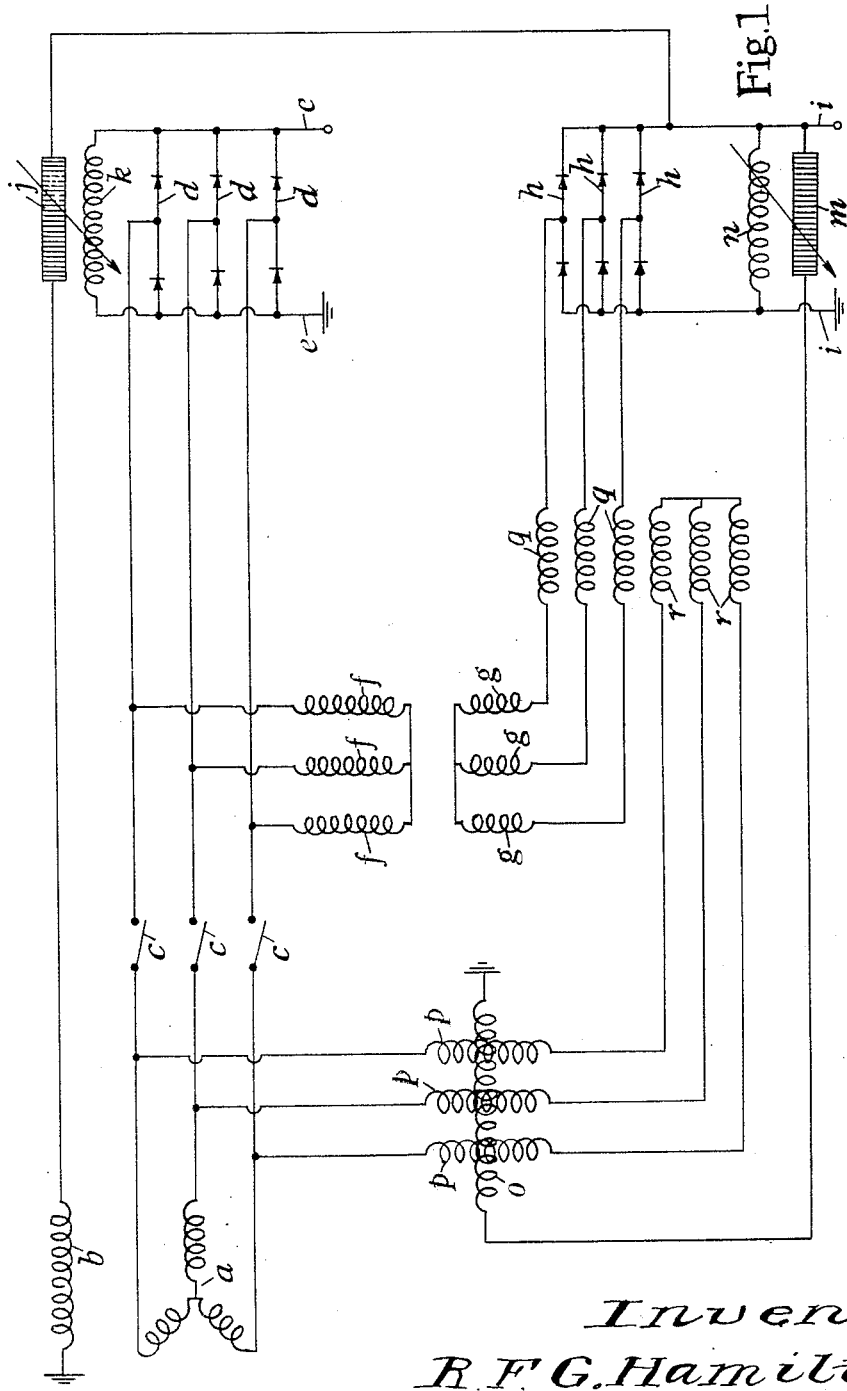
Figure 2:
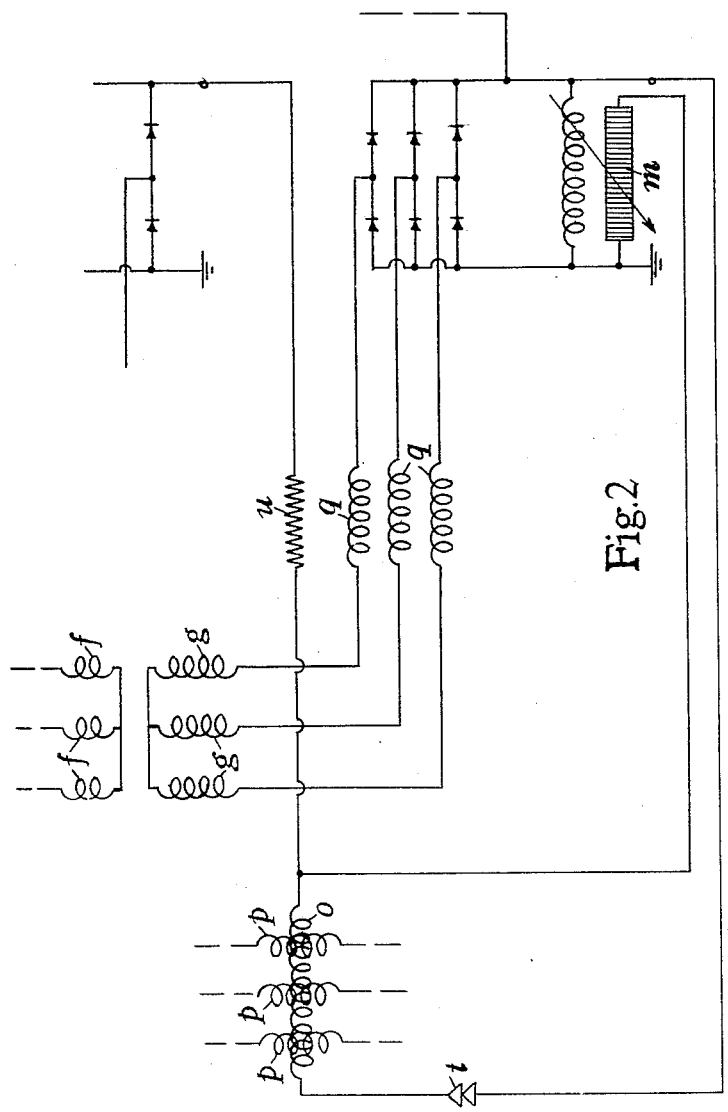

The accompanying diagrams at Figures 1 and 2 illustrate two embodiments of the invention.

Referring to Figure 1, a known system for which the invention is required comprises a variable speed three-phase alternating current generator, the generator windings of which are indicated by $a$ and the field winding by $b$. This generator is connected through switch gear $c$ and whole-wave rectifiers $d$ to a circuit $e$ herein termed the high voltage circuit, the normal working voltage of which is, for example, 110 volts. Between the switch gear and the rectifier are connected the primary windings $f$ of a step-down transformer, the secondary windings $g$ of which are connected through whole-wave rectifiers $h$ to the circuit $i$ herein termed the low voltage circuit, the normal working voltage of which is, for example, 24 volts. Any convenient voltage regulator such as a carbon pile $j$ controlled by an electromagnet $k$ and acting on the field winding $b$ of the generator, is provided in association with the high voltage circuit, one end of the pile being connected to the low voltage circuit as shown. Also a similar voltage regulator comprising a carbon pile $m$ and electromagnet $n$ is provided in association with the low voltage circuit, but this regulator is arranged to control a winding $o$ of a saturable choke, whose other windings $p$ are connected to the generator windings $a$.

According to my invention I adapt the step-down transformer $f$, $g$ to generate a voltage which is lower than the normal working voltage of the low voltage circuit $i$, and in series with the secondary windings of this transformer I connect the secondary windings $q$ of a booster transformer, so that the vectorial sum of the voltages of the two transformers corresponds to the nominal working voltage of the low voltage circuit. The primary windings $r$ of the booster transformer are energised by current supplied from the generator through the choke windings $p$ which are carried by a saturable core, the latter having a control winding $o$ which is supplied with current from the low voltage circuit through the associated voltage regulator $m$, $n$.

When it is required that the current supplied to the control winding $o$ of the choke shall be variable between zero and some maximum value, I employ the modified system illustrated by Figure 2. One end of the control winding $o$ of the saturable choke is connected to one side of the low voltage circuit, and the other end of the said winding is connected to one end of the carbon pile $m$ as shown. Also the said other end of the winding $o$ is connected through a (fixed or variable) resistance $u$ to one side of the high voltage circuit. Alternatively the said end may be connected to one side of any other circuit of higher voltage than the low-voltage circuit. In other respects the modified system is similar to that shown in Figure 1.

The parts $u$ and $m$ virtually form a potentiometer which determines the quantity of current flowing through the control winding $o$. If desired a rectifier $t$ may be provided as shown to obviate risk of a reverse current flow through $o$.

By this invention close regulation of the voltage of the low voltage circuit can be effected in a simple and satisfactory manner.

Having thus described my invention what I claim as new and desire to secure by Letters Patent is:

1. An electric current supply system, comprising in combination a variable speed alternating current generator having field and generating windings, a pair of electric circuits for direct current at different voltages, rectifying means through which direct current can be supplied to the higher voltage circuit from the generator, a step-down transformer having its input side connected to the higher voltage circuit at the generator side of the rectifying means, additional rectifying means through which direct current can be supplied to the lower voltage circuit from the output side of the step-down transformer, a booster transformer having its output side connected between the output side of the step-down transformer and the last mentioned rectifying means, a saturable choke connected between the generator and the input side of the booster transformer and provided with a control winding, a voltage regulator for the control winding of the saturable choke, and a second voltage regulator for the field winding of the generator, the first mentioned voltage regulator having a controlling winding connected across the lower voltage winding, and a variable resistance connected between the lower voltage circuit and the control winding of the saturable choke, and the second voltage regulator having a controlling winding connected across the higher voltage circuit, and a variable resistance connected between the field winding of the generator and the lower voltage circuit.

2. An electric current supply system as claimed in claim 1 and having in combination with the control winding of the saturable choke, a resistance, and a circuit which is of higher voltage than the lower voltage circuit, and which is connected by the resistance to one end of the control winding, the said end of the control winding being also connected to the variable resistance of the voltage regulator for the control winding.

RALPH FREDERIC GILBERT HAMILTON.

REFERENCES CITED

The following references are of record in the file of this patent:

UNITED STATES PATENTS

| Number | Name | Date |
| --- | --- | --- |
| 2,349,685 | Trucksess | May 23, 1944 |